(12) United States Patent
Chung

(10) Patent No.: US 12,105,665 B2
(45) Date of Patent: Oct. 1, 2024

(54) UNIVERSAL SERIAL BUS CONTROL DEVICE AND CONTROL METHOD THEREOF

(71) Applicant: VIA Technologies, Inc., New Taipei (TW)

(72) Inventor: Chien-Ping Chung, New Taipei (TW)

(73) Assignee: VIA Technologies, Inc., New Taipei (TW)

( * ) Notice: Subject to any disclaimer, the term of this patent is extended or adjusted under 35 U.S.C. 154(b) by 0 days.

(21) Appl. No.: 18/156,391

(22) Filed: Jan. 19, 2023

(65) Prior Publication Data

US 2023/0259484 A1    Aug. 17, 2023

Related U.S. Application Data

(60) Provisional application No. 63/310,118, filed on Feb. 15, 2022.

(30) Foreign Application Priority Data

Oct. 6, 2022    (TW) .................................. 111137998

(51) Int. Cl.
  *G06F 13/42*    (2006.01)
(52) U.S. Cl.
  CPC .. *G06F 13/4282* (2013.01); *G06F 2213/0042* (2013.01)
(58) Field of Classification Search
  None
  See application file for complete search history.

(56) References Cited

U.S. PATENT DOCUMENTS 9,286,460 B2 *    3/2016  Soffer ..................... G06F 21/34
9,665,525 B2 *    5/2017  Soffer ................. G06F 13/4068
(Continued)

FOREIGN PATENT DOCUMENTS

| CN | 101620578 | 1/2010 |
| TW | I502352 | 10/2015 |
| TW | I741765 | 10/2021 |

OTHER PUBLICATIONS

"Office Action of Taiwan Counterpart Application", issued on Aug. 28, 2023, p. 1-p. 8.

(Continued)

*Primary Examiner* — Farley Abad
*Assistant Examiner* — Dayton Lewis-Taylor
(74) *Attorney, Agent, or Firm* — JCIPRNET

(57) ABSTRACT

A universal serial bus (USB) control device and a control method thereof are provided. The USB control device includes multiple host interfaces, multiple USB ports, a bus physical layer circuit, a microprocessor, and a bus schedule controller. The bus schedule controller controls the bus physical layer circuit according to a USB task. The microprocessor obtains a USB task command through the host interface, which includes a USB port number of a specific host interface. The microprocessor queries the USB port number of the specific host interface based on an index lookup table to correspond to a specific USB port, generates the USB task according to the specific USB port, and transmits the USB task to the bus schedule controller. The index lookup table is configured to record a relationship between a part of the USB port that each host interface is responsible for and the USB port number.

12 Claims, 3 Drawing Sheets

(56) References Cited

U.S. PATENT DOCUMENTS

2013/0054847 A1* 2/2013 Cho ................ G06F 3/0689
710/38
2022/0070058 A1* 3/2022 Lee .................. H04L 41/0806

OTHER PUBLICATIONS

"Office Action of Taiwan Counterpart Application", issued on May 4, 2023, p. 1-p. 9.

* cited by examiner

UNIVERSAL SERIAL BUS CONTROL DEVICE AND CONTROL METHOD THEREOF

CROSS-REFERENCE TO RELATED APPLICATION

This application claims the priority benefit of U.S. provisional application Ser. No. 63/310,118, filed on Feb. 15, 2022, and Taiwan application serial no. 111137998, filed on Oct. 6, 2022. The entirety of each of the above-mentioned patent applications is hereby incorporated by reference herein and made a part of this specification.

BACKGROUND

Technical Field

The disclosure relates to a computer technology using a universal serial bus (USB), and in particular, to a universal serial bus control device and a control method thereof.

Description of Related Art

At present, the most commonly used connection interface for computer peripheral devices is the USB interface. From small mobile devices to large workstations, the USB interface is continually used. Devices using the USB interface (hereinafter referred to as USB devices) have various types and application characteristics, for example, display screens, high-definition cameras, and speakers having high bandwidth transmission requirements. Some devices (such as face recognition cameras, fingerprint scanning devices, and flash drives) have information security requirements. There are no special types and application characteristics for general-purpose human-computer input devices (such as keyboards, mice, etc.), fans, and mobile power supplies, etc. Since there are too many types of USB devices, it is difficult to classify the USB devices, thereby resulting in the difficulty to manage the USB devices.

Therefore, how the USB devices may be classified and managed while maintaining the flexible functionality of the USB itself has been the research trend of the practical application of the USB device management technology.

SUMMARY

The disclosure provides a universal serial bus control device and a control method thereof, which may enable the USB control device to classify and manage various types of USB devices through multiple host interfaces, and enable all USB ports in the USB control device to still have the flexible functionality.

An universal serial bus (USB) control device of the embodiment of the disclosure includes multiple host interfaces, multiple universal serial bus (USB) ports, a bus physical layer circuit coupled to the USB port, a microprocessor coupled to the host interface, and a bus schedule controller coupled to the host interface, the microprocessor, and the bus physical layer circuit. The bus schedule controller controls the bus physical layer circuit according to at least one USB task. The microprocessor obtains a USB task command through the host interface, and the USB task command includes a USB port number of a specific host interface, in which the specific host interface is one of the host interfaces. The microprocessor queries the USB port number of the specific host interface to correspond to a specific USB port based on an index lookup table, generates the at least one USB task according to the specific USB port, and transmits the at least one USB task to the bus schedule controller. The specific USB port is one of the USB ports, and the index lookup table is configured to record the relationship between a part of the USB ports that each host interface is responsible for and the USB port number.

A control method of a universal serial bus control device according to an embodiment of the disclosure is provided hereafter. A USB task command is obtained through multiple host interfaces, and the USB task command includes a USB port number of a specific host interface, in which the specific host interface is one of the host interfaces. The USB port number of the specific host interface is queried to correspond to a specific USB port based on an index lookup table. At least one USB task is generated according to the specific USB port, in which the specific USB port is one of the USB ports, and the index lookup table is configured to record the relationship between a part of the bus connection port that each host interface is responsible for and the USB port number. The at least one USB task is completed by a bus schedule controller and a bus physical layer circuit.

Based on the above, the universal serial bus control device and the control method thereof of the embodiments of the disclosure dispose the multiple host interfaces in the USB control device, and configure and share some hardware components using the index lookup table, thereby utilizing the various judgment mechanisms to classify and manage the various types of USB devices, and enabling all the USB ports in the USB control device to still have the flexible functionality.

DESCRIPTION OF THE EMBODIMENTS

Based on the fact that USB devices are very popular and widely used in various applications, how the USB devices may be classified and managed according to the types or application characteristics of the USB devices has been a practical trend. However, if the USB control device wishes to manage the USB device by detecting a specific category, it is necessary to use the judgment mechanism and the hardware corresponding to the category. Such a judgment mechanism often needs to be formulated separately, and currently there is no unified judgment mechanism to classify and manage the USB devices.

For example, USB display devices or USB audio devices that require high-frequency bandwidth and USB keyboards or mice that require low-frequency bandwidth are classified and managed according to the bandwidth requirement. USB face recognition cameras, fingerprint scanning devices, or flash drives with high information security control levels and general USB devices (such as USB fans, mobile power supplies, etc.) with ordinary information security control levels are classified and managed according to the information security control levels. The USB control device may use the host interface identifier (ID) of the USB device as a judgment mechanism for a specific category, so as to facilitate the management of the USB device and the allocation of the physical resources, and each judgment mechanism requires a corresponding hardware implementation.

If the USB control device wishes to manage the USB devices with the various types or application characteristics, it is also necessary to divide the USB ports into different purposes, in addition to needing the various judgment mechanisms and hardware. For example, if the computer device has ten USB ports, and a USB control device 100 wishes to detect two special purposes (high-speed transmission purpose and high information security purpose), it may be necessary to allocate four of the ten USB ports to USB devices for high-speed transmission purposes, and the other six of the ten USB ports to USB devices for high information security purposes when designing the computer device. In this way, the original flexible functionality of the USB port is lost.

Therefore, in the embodiment of the disclosure, the multiple host controller interfaces are used in the USB control device, and the index lookup table is configured to enable the host interfaces to configure and share the rest of the hardware components, so that the various judgment mechanisms may be configured to classify and manage the USB devices, and all the USB ports in the USB control device are enabled to still have the flexible functionality.

Figure 1:
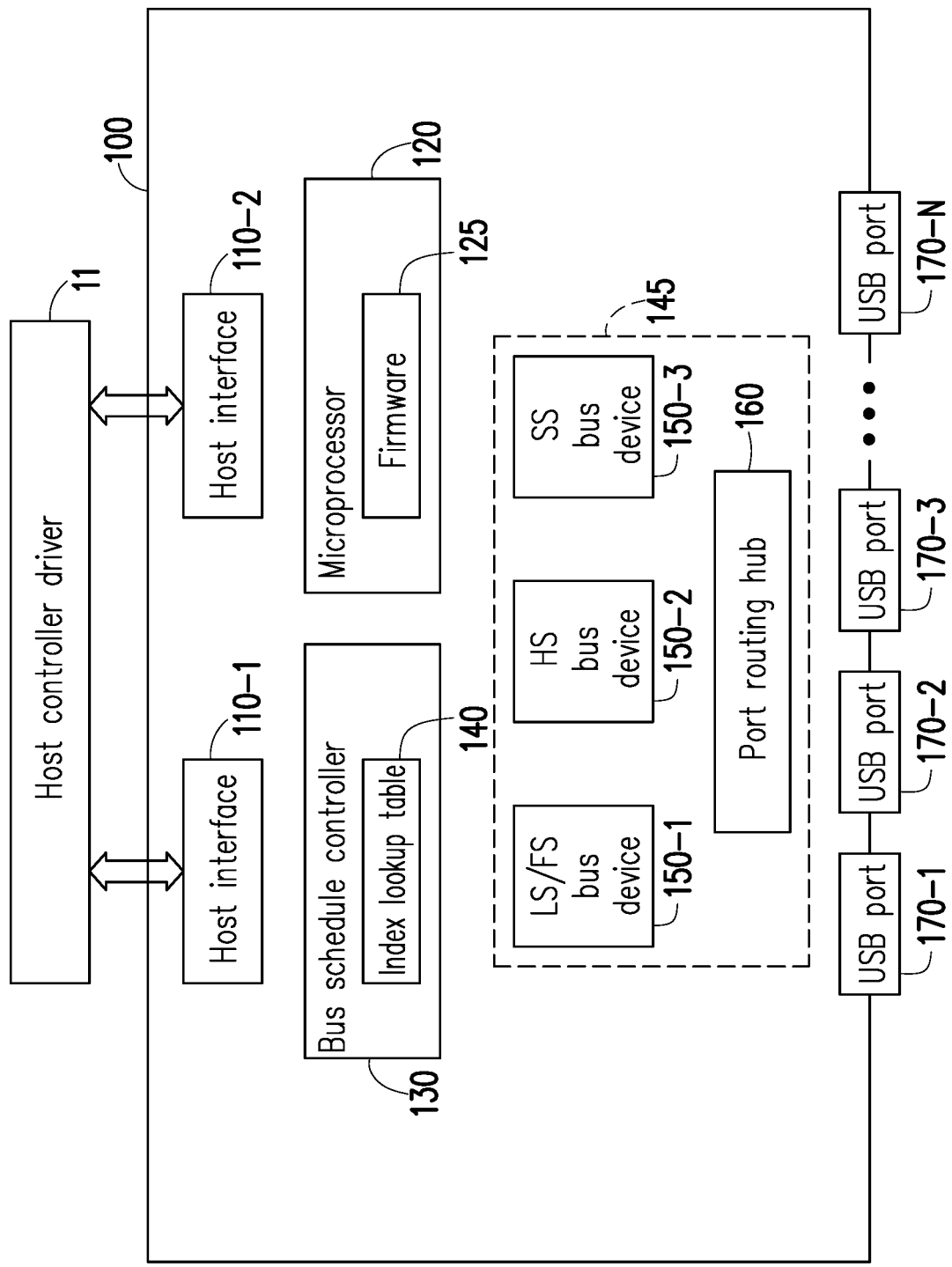
FIG. 1 is a block diagram of a universal serial bus (USB) control device 100 according to an embodiment of the disclosure.

FIG. 1 is a block diagram of a universal serial bus (USB) control device 100 according to an embodiment of the disclosure. The USB control device 100 of the embodiment uses an eXtensible host controller interface (xHCI) as its control interface. The USB control device 100 may also be referred to as a USB xHCI control device. The USB control device 100 of the embodiment is controlled by an eXtensible host controller driver (xHCD) 11.

The USB control device 100 may support a bus/device/function (BDF) of the PCI interface as a host interface identifier (ID) of the USB device to classify the USB devices. That is to say, embodiments consistent with the disclosure may use the bus/device/function (BDF) as the host interface identifier (ID) of the USB device, and the USB control device 100 may detect the host interface identifier corresponding to each USB device to judge whether the characteristics of the USB device fall under the special purpose (such as the high-speed transmission purpose or the high information security purpose, etc.) or the general purpose.

The USB control device 100 of the embodiment includes multiple host interfaces 110-1, 110-2, a microprocessor 120, a bus schedule controller 130, a bus physical layer circuit 145, and multiple USB ports 170-1 to 170-N (where N is a positive integer greater than 1). The bus physical layer circuit 145 of the embodiment may include bus devices based on the different transmission speeds and a port routing hub 160. A firmware 125 may be stored in the microprocessor 120.

The embodiment takes two host interfaces 110-1, 110-2 as examples, and those who apply the embodiment may adjust the number of the host interfaces according to their needs. The host interfaces 110-1, 110-2 may include a hardware interface control circuit defined by xHCI and run according to the xHCI, so as to communicate with the eXtensible host controller driver (xHCD) 11. The xHCD 11 is controlled by the operating system in the memory device, so the xHCD 11 may also be called the operating system host driver.

For example, when the computer device equipped with the USB control device 100 needs to access the USB device connected to a certain USB port, the xHCD 11 transmits the USB task command to the host interfaces 110-1, 110-2. The host interfaces 110-1, 110-2 may obtain the respective USB task commands from the xHCD 11. The USB task command is mainly composed of one of the USB ports 170-1 to 170-N and the USB task corresponding to the aforementioned single USB port. The USB task may be to perform data access or the corresponding operation command with the USB device connected to the corresponding USB port.

The microprocessor 120 may implement the embodiments of the disclosure by running the firmware stored therein. The microprocessor 120 of the embodiment of the disclosure respectively obtains the USB task corresponding to the aforementioned USB port through the host interfaces 110-1, 110-2, and assigns and transmits the USB task to the bus schedule controller 130 according to the characteristics of the USB task command and the definition of the USB specification.

In the embodiment, the bus devices based on the different transmission speeds may include a low-speed (LS)/full-speed (FS) bus device 150-1 (which may be referred to as a first rate bus device), a high-speed (HS) bus device 150-2 for USB 2.0 (which may be referred to as a second rate bus device), and a SuperSpeed (SS) bus device 150-3 (which may be referred to as a third rate bus device). In other words, the bus devices 150-1 to 150-3 are physical layer hardware devices or circuits for processing the respective transmission rates defined in the USB protocol.

The bus schedule controller 130 controls the bus physical layer circuit 145 according to the requirement of the USB task command, so as to perform the corresponding processing on the packet corresponding to the USB bus. Specifically, the bus schedule controller 130 controls the port routing hub 160 and the bus devices 150-1 to 150-3 based on the USB task scheduled by the microprocessor 120, so that one of the corresponding USB ports 170-1 to 170-N is connected to one of the bus devices 150-1 to 150-3, and controls one of the connected bus devices 150-1 to 150-3 to access data with the USB device connected to one of the aforementioned USB ports 170-1 to 170-N, so as to complete the USB task. For example, when the USB device connected to the USB port 170-1 only supports the USB 1.1 transmission rate and the xHCD 11 wants to access data with the USB device, the bus schedule controller 130 controls the port routing hub 160 to connect the USB port 170-1 to the bus device 150-1 supporting the USB 1.1 transmission rate, so as to complete the USB task of accessing the data between the xHCD 11 and the USB device. When the USB device connected to the USB port 170-2 may support the USB 3.0 transmission rate and the xHCD 11 wants to access data with the USB device, the bus schedule controller 130 controls the port routing hub 160 to connect the USB port 170-2 to the bus device 150-3 supporting the USB 3.0 transmission rate, so as to complete the USB task of accessing the data between the xHCD 11 and the USB device.

The bus schedule controller 130 performs the corresponding processing on the packet corresponding to the USB bus according to the requirement of the USB task command. If there is a need to use or access the system memory (e.g., a double data rate (DDR) synchronous dynamic random access memory (SDRAM) in a memory device), the bus schedule controller 130 brings the host interface identifier corresponding to the USB device and related to the access operation into the memory access transaction, controls the port routing hub 160 to connect one of the corresponding USB ports 170-1 to 170-N to one of the bus devices 150-1 to 150-3 based on the aforementioned process, and controls one of the connected bus devices 150-1 to 150-3 to access data with the USB device connected to one of the aforementioned USB ports 170-1 to 170-N so as to complete the USB task.

When the host interfaces 110-1 and 110-2 all use the same judgment mechanism, the purpose corresponding to the USB device (e.g., high-speed transmission or high information security requirements) may only be unique. However, if the host interface 110-1 and the host interface 110-2 use different judgment mechanisms, since each judgment mechanism corresponds to a different purpose for the respective host interface identifiers, the judgment mechanism for the USB device controlled by the same host interface identifier may be inconsistent with the purpose defined by the host interface identifier, thereby causing confusion. For example, when the host interface identifiers defined by the different purposes are all the same value, the host interfaces 110-1 and 110-2 will be confused by the host interface identifiers with the same value, and it is impossible to know for what purpose the host interface identifier is defined.

In order to avoid the foregoing problems, the embodiment of the disclosure establishes an index lookup table 140, which is configured to record the relationship between each of the host interfaces 110-1 and 110-2 and the USB ports that the host interfaces 110-1 and 110-2 are responsible for, so as to enable the microprocessor 120 to know which USB port each of the host interfaces 110-1 and 110-2 is responsible for according to the content in the index lookup table 140, and execute the USB task through the corresponding host interface. In other words, the index lookup table of the embodiment may record the USB ports that each host interface is responsible for, and the xHCD 11 may modify the data in the index lookup table through the command, so that there is no need to physically and inflexibly assign multiple specific ports to a specific host interface. The USB device connected to a certain USB port may be changed from one host interface to another host interface by flexibly modifying the data in the index lookup table, and the aforementioned modifications do not require the user to insert the USB device from one USB port to another USB port.

In the embodiment, the index lookup table 140 is set up in the bus schedule controller 130, and those who apply the embodiment may adjust the location of the index lookup table 140 according to their needs. For example, the index lookup table 140 may be set up in a microprocessor 120 or another memory component (not shown), so as to enable access for the component that needs to use (such as the microprocessor 120, the host interfaces 110-1 and 110-2, or the bus schedule controller 130).

Figure 2:
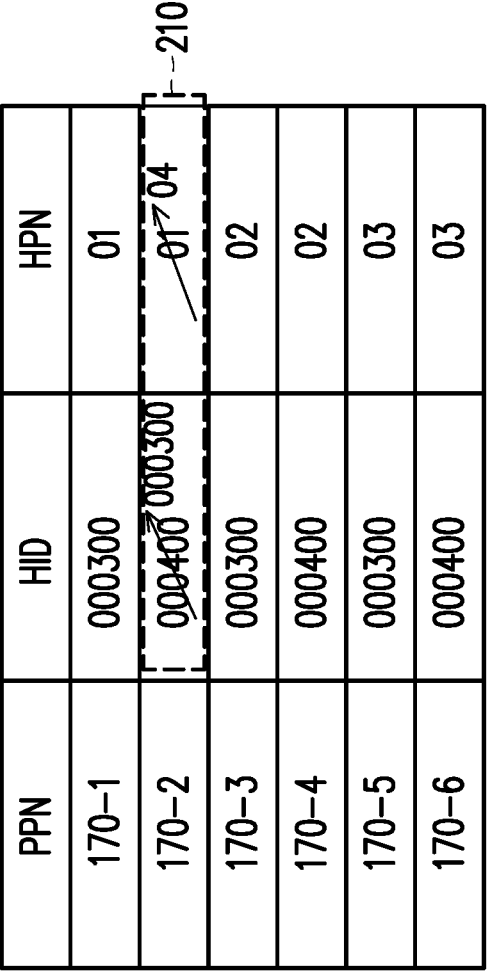
FIG. 2 is a schematic diagram of an index lookup table 140 according to an embodiment of the disclosure.

FIG. 2 is a schematic diagram of an index lookup table 140 according to an embodiment of the disclosure. The field PPN (also referred to as the first field) of the index lookup table 140 is configured to indicate the USB port number, and the field HID (also referred to as the second field) is configured to indicate the host interface identifier corresponding to the host interface whom is responsible for the aforementioned USB port, and the field HPN (also referred to as the third field) is configured to indicate the USB port number that the host interface is responsible for.

Assume here that the number of the USB ports in FIG. 1 is 6 (that is, N=6), and are presented as USB ports 170-1 to 170-6 in the index lookup table 140, so the field PPN lists the USB ports 170-1 to 170-6. The host interface identifier of the host interface 110-1 in FIG. 1 is "Bus0 Dev3 Func0" and is presented as "000300" in the field HID of the index lookup table 140, and the host interface identifier of the host interface 110-2 in FIG. 1 is "Bus0 Dev4 Func0" and is presented as "000400" in the field HID of the index lookup table 140. The host interface 110-1 is responsible for the USB tasks of the USB ports 170-1, 170-3, and 170-5, so the fields HID corresponding to the fields PPN "170-1", "170-3", and "170-5" are all "000300", and the fields HPN corresponding to the fields PPN "170-1", "170-3", and "170-5" are "01", "02", and "03", respectively, which are configured to indicate that the USB port number "01" in the host interface 110-1 is USB port 170-1, the USB port number "02" in the host interface 110-1 is USB port 170-3, and the USB port number "03" in the host interface 110-1 is USB port 170-5. By analogy, the fields HID corresponding to the fields PPN "170-2", "170-4" and "170-6" are all "000400" indicating the host interface 110-2, and the USB port number "01" in the host interface 110-2 is USB port 170-2, the USB port number "02" in the host interface 110-2 is USB port 170-4, and the USB port number "03" in the host interface 110-2 is USB port 170-6.

The index lookup table 140 may be established when the computer device is turned on and the firmware 125 is run through the microprocessor 120. On the other hand, since the USB technology supports hot plugging, and when the computer device is turned off, the connection relationship of the USB device may be changed, the index lookup table 140, may also be dynamically established by the microprocessor 120 through the preset attributes when running the firmware, or established by the xHCD 11 according to the classification required for management.

The attributes for classification management may be classified by performance attributes or security attributes, for example. In other words, the aforementioned judgment mechanism used for the classification may be flexibly planned or implemented according to the settings of the system manufacturer or the manufacturer, and those who apply the embodiment are not limited to the application of the aforementioned judgment mechanism for classification management. For example, the host interface identifier "Bus0 Dev3 Func0" may be set to high performance, while the host interface identifier "Bus0 Dev4 Func0" may be set to normal performance, or the host interface identifier "Bus0 Dev3 Func0" may be set as high security, while the host interface identifier "Bus0 Dev4 Func0" may be set as low security or normal security. For example, a computer device that implements an input-output memory management unit (IOMMU) or a system memory management unit (SMMU) may be configured according to the different host interface identifiers (or the bus/device/function (BDF) of the PCI interface) to achieve the function of attribute characteristics. For example, the IOMMU or the SMMU may determine the access authority of the system security according to the different host interface identifiers. For instance, a low-security host interface identifier does not allow access to the area where high-security data is stored, so issuing access transactions with different host interface identifiers is the basic component for achieving classification attribute characteristics.

Referring to FIG. 2, it is assumed here that the host interface 110-1 is configured to process high security tasks, and the host interface 110-2 is configured to process low security or general security tasks. When a high-security USB device (e.g., a fingerprint scanner) is connected to the USB port 170-2, the xHCD 11 recognizes that the settings of the fingerprint scanner are connected to the host interface 110-2 used for handling low-security or normal-security tasks. Therefore, the xHCD 11 initiates the modification command of the index lookup table 140, and as shown in the dashed box 210 in FIG. 2, the field HID and the field HPN having the field PPN being "170-2" are changed from the original "000400" and "01" to "000300" and "04", which is equivalent to removing the fingerprint scanner from the USB port number "01" of the host interface 110-2 and inserting it into the USB port number "04" of the host interface 110-1, in order to allow the fingerprint scanner to be controlled by the host interface 110-1. Therefore, the xHCD 11 may restart the USB control device 100 again to identify the fingerprint scanner, and successfully complete the relevant functions of the actual operation because the security has met the required conditions.

On the other hand, when the computer device is ready to be shut down, a USB processing device 110 may store the currently configured index lookup table 140 in the non-volatile memory device of the computer device (such as a basic input output system (BIOS) or a specific hard disk area). When the computer device is turned on the next time, if an effective index lookup table 140 is found in the basic input output system (BIOS) or the specific hard disk area, the USB processing device 110 of the embodiment may directly load the content in the aforementioned non-volatile memory device into the index lookup table 140 for use by the USB processing device 110. Therefore, the embodiment of the disclosure provides a method of modifying the index lookup table 140 by software modification, which may maintain the flexibility of the USB port in use.

Figure 3:
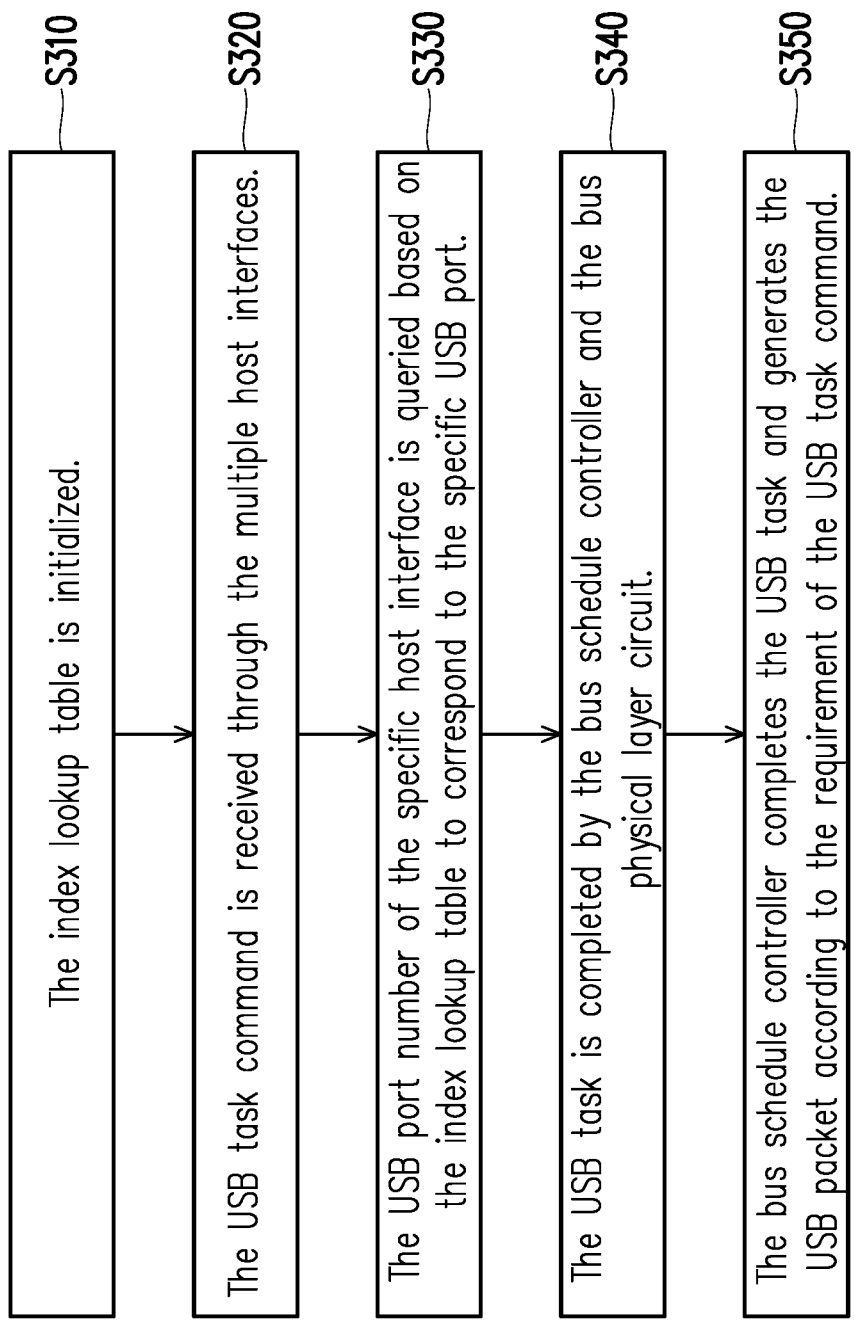
FIG. 3 is a flow diagram of a control method of a universal serial bus (USB) control device 100 according to an embodiment of the disclosure.

FIG. 3 is a flow diagram of a control method of a universal serial bus (USB) control device 100 according to an embodiment of the disclosure. The method shown in FIG. 3 may be implemented by the microprocessor 120 of the USB control device 100 in FIG. 1, or implemented by firmware executed in the microprocessor 120. In step S310, the index lookup table may be initialized by the microprocessor 120 or by the xHCD 11 through the microprocessor 120. As mentioned above, when the computer device equipped with the USB control device 100 is turned on or the USB device is connected to the USB control device 100 through the USB ports 170-1 to 170-N, the microprocessor 120 may set the required index lookup table 140 according to the judgment mechanism of the required classification management, or initialize the index lookup table 140 by loading the content pre-stored in the BIOS.

In step S320, the microprocessor 120 receives the USB task command through the host interfaces 110-1 and 110-2. In the embodiment, it is assumed that the USB task command includes the USB task with the USB port number "02" issued by the host interface 110-1 (referred to as a specific host interface in the embodiment). In other words, the xHCD 11 issues the USB task command to the host interface 110-1, and the microprocessor 120 receives the USB task issued by the host interface 110-1 having the USB port number corresponding to the host interface through the host interface 110-1. The specific host interface is one of the host interfaces 110-1 and 110-2.

In step S330, the microprocessor 120 queries the USB port number ("02") of the specific host interface (the host interface 110-1) based on the index lookup table 140 to correspond to the specific USB port, and generates at least one USB task according to the specific USB port. Specifically, the microprocessor 120 queries the data in the third row through the index lookup table 140 according to the host interface identifier "000300" corresponding to the host interface 110-1 and the USB port number "02", so that the USB port 170-3 corresponding to the aforementioned information and located in the field PPN of the index lookup table 140 is queried and used as the aforementioned specific USB port. Moreover, the microprocessor 120 generates at least one USB task based on the requirement of the USB task command according to the specific USB port (USB port 170-3). The specific USB port of the embodiment is one of the USB ports 170-1 to 170-N. The index lookup table 140 is configured to record the relationship between a part of the USB port that each host interface 110-1, 110-2 is responsible for and the USB port number. For example, it may be known from the index lookup table 140 that the field PPN corresponding to the host interface identifier (field HID) being "000300" and the USB number (the corresponding field HPN) being "02" is "170-3".

In step S340, the microprocessor 120 transmits the USB task of the USB port 170-3 to the bus schedule controller 130 according to the characteristics of the USB task command and the definition of the USB specification, so that the aforementioned USB tasks may be completed by the bus schedule controller 130 and the bus physical layer circuit 145.

In step S350, the bus schedule controller 130 completes the corresponding USB task and generates the USB packet according to the requirement of the USB task command. The USB packet is transmitted back to the xHCD 11 for data access with the USB device. When executing the USB task corresponding to the specific USB port (for example, USB port 170-3), if there is a need to use or access the system memory (e.g., a double data rate (DDR) synchronous dynamic random access memory (SDRAM) in a memory device), the host interface identifier corresponding to any of the host interfaces 110-1, 110-2 is determined and brought into the transaction of the access system memory according to the index lookup table 140, and the USB task is completed according to the basis of the aforementioned process.

Based on the aforementioned steps and operations, the embodiment of the disclosure may be implemented to share the rest of the hardware components (such as the microprocessor 120, the bus schedule controller 130, the bus devices 150-1 to 150-3, the port routing hub 160, or the USB ports 170-1 to 170-N in FIG. 1) to the multiple host interfaces (such as the host interfaces 110-1 and 110-2 in FIG. 1) through the index lookup table 140, thereby using the various judgment mechanisms to classify and manage the USB devices, for example, using the different host interfaces to correspond to the different judgment mechanisms, so that all the USB ports in the USB control device still have the flexible functionality.

If security is used as an example of the judgment mechanism, the operating system on the computer device may be planned in the setting of the IOMMU, and all transactions of the host interface 110-2 (having the host interface identifier "000400") in FIG. 1 may only access the memory address blocks with a lower or normal security. Therefore, if a certain low-security USB device intends to use a high-security address block assuming that it violates the security principle, the IOMMU will issue a result of denying access. Therefore, after the xHCD 11 has identified the device type of the USB device connected to one of the USB ports 170-1 to 170-N on the USB control device 100, it will allocate memory blocks that meet the security principles to operate the USB device, so as to complete the settings in accordance with the security.

In summary, the universal serial bus control device and the control method thereof described in the embodiments of the disclosure dispose the multiple host interfaces in the USB control device, and configure and share some hardware components using the index lookup table, thereby utilizing the various judgment mechanism to classify and manage the various types of USB devices, and enabling all the USB ports in the USB control device to still have the flexible functionality.

What is claimed is:

1. A universal serial bus (USB) control device, comprising:
    a plurality of host interfaces;
    a plurality of universal serial bus (USB) ports;
    a microprocessor, coupled to the host interfaces; and
    a bus schedule controller, coupled to the host interface and the microprocessor,
    wherein the microprocessor obtains a universal serial bus (USB) task command through the host interfaces, the universal serial bus (USB) task command comprises a universal serial bus (USB) port number of a specific host interface, and the specific host interface is one of the host interfaces,
    wherein the microprocessor queries the universal serial bus (USB) port number of the specific host interface based on an index lookup table to correspond to a specific universal serial bus (USB) port, generates at least one universal serial bus (USB) task according to the specific universal serial bus (USB) port, and transmits the at least one universal serial bus (USB) task to the bus schedule controller,
    wherein the specific universal serial bus (USB) port is one of the universal serial bus (USB) ports, and the index lookup table is configured to record a relationship between a part of the universal serial bus (USB) port that each host interface is responsible for and the universal serial bus (USB) port number.

2. The universal serial bus (USB) control device according to claim 1, wherein the bus schedule controller stores the index lookup table.

3. The universal serial bus (USB) control device according to claim 1, wherein the microprocessor receives a modification command related to the index lookup table to modify data in the index lookup table.

4. The universal serial bus (USB) control device according to claim 1, wherein the universal serial bus (USB) control device is controlled by a host controller driver, coupled to the host interfaces, and configured to provide the universal serial bus (USB) task command to the host interfaces or a modification command related to the index lookup table to the microprocessor.

5. The universal serial bus (USB) control device according to claim 1, wherein the microprocessor is also configured to initialize the index lookup table.

6. The universal serial bus (USB) control device according to claim 1, wherein the index lookup table comprises a plurality of fields, and the fields comprise:
    a first field, configured to indicate that the universal serial bus (USB) port is located at a local number of the universal serial bus (USB) control device;
    a second field, configured to indicate a host interface identifier corresponding to the host interfaces; and
    a third field, configured to indicate the universal serial bus (USB) port number corresponding to the host interfaces.

7. The universal serial bus (USB) control device according to claim 1, further comprising:
    a bus physical layer circuit, coupled to the universal serial bus (USB) port, wherein the bus schedule controller controls the bus physical layer circuit according to the at least one universal serial bus (USB) task, and the bus physical layer circuit comprises:
        a plurality of bus devices, wherein each bus device is configured to communicate with a universal serial bus (USB) device through a corresponding universal serial bus (USB) transmission rate, and the universal serial bus (USB) device is coupled to the universal serial bus (USB) control device through one of the universal serial bus (USB) ports; and
        a port routing hub, coupled to the universal serial bus (USB) port and the bus device, and configured to being controlled by the bus schedule controller to electrically connect one or more of the universal serial bus (USB) ports to one of the bus devices.

8. The universal serial bus (USB) control device according to claim 6, wherein the bus device comprises:
    a first rate bus device, configured to communicate with the universal serial bus (USB) device according to a first rate;
    a second rate bus device, configured to communicate with the universal serial bus (USB) device according to a second rate; and
    a third rate bus device, configured to communicate with the universal serial bus (USB) device according to a third rate.

9. A control method of a universal serial bus (USB) control device, comprising:
    obtaining a universal serial bus (USB) task command through a plurality of host interfaces, wherein the universal serial bus (USB) task command comprises a universal serial bus (USB) port number of a specific host interface, and the specific host interface is one of the host interfaces;
    querying the universal serial bus (USB) port number of the specific host interface based on an index lookup table to correspond to a specific universal serial bus (USB) port, and generating at least one universal serial bus (USB) task according to the specific universal serial bus (USB) port, wherein the specific universal serial bus (USB) port is one of universal serial bus (USB) ports, and the index lookup table is configured to record a relationship between a part of the universal serial bus (USB) port that each host interface is responsible for and the universal serial bus (USB) port number; and
    completing the at least one universal serial bus (USB) task by a bus schedule controller.

10. The control method according to claim 9, further comprising:
    receiving a modification command related to the index lookup table to modify data in the index lookup table.

11. The control method according to claim 9, wherein the index lookup table comprises a plurality of fields, and the fields comprise:
    a first field, configured to indicate that the universal serial bus (USB) port is located at a local number of the universal serial bus (USB) control device;
    a second field, configured to indicate a host interface identifier corresponding to the host interfaces; and
    a third field, configured to indicate the universal serial bus (USB) port number corresponding to the host interfaces.

12. The control method according to claim 9, further comprising:
    initializing the index lookup table.

* * * * *